United States Patent
Yi et al.

(10) Patent No.: US 8,954,191 B2
(45) Date of Patent: Feb. 10, 2015

(54) MOBILE ROBOT AND CONTROLLING METHOD OF THE SAME

(75) Inventors: Dong Hoon Yi, Seoul (KR); Young Gie Kim, Seoul (KR); Jeong Suk Yoon, Seoul (KR); Seong Soo Lee, Seoul (KR); Jei Hun Lee, Seoul (KR); Seung Min Baek, Seoul (KR); Yoo Jin Choi, Seoul (KR); Sang Ik Na, Seoul (KR); Su Uk Choe, Seoul (KR); Yie Bin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 692 days.

(21) Appl. No.: 12/718,380

(22) Filed: Mar. 5, 2010

(65) Prior Publication Data

US 2010/0228394 A1 Sep. 9, 2010

(30) Foreign Application Priority Data

Mar. 6, 2009 (KR) ........................ 10-2009-0019459

(51) Int. Cl.
- *G05B 19/04* (2006.01)
- *G05B 19/18* (2006.01)
- *G05D 1/02* (2006.01)

(52) U.S. Cl.
CPC ............ *G05D 1/0274* (2013.01); *G05D 1/0246* (2013.01); *G05D 1/0255* (2013.01); *G05D 2201/0203* (2013.01)
USPC ........... 700/253; 700/245; 700/251; 700/259; 318/568.11; 318/568.12; 318/568.16; 318/568.19

(58) Field of Classification Search
USPC ............. 700/245, 251, 253, 259; 318/568.11, 318/568.12, 568.16, 568.19; 701/26, 28; 901/1, 46, 47; 345/419; 702/152; 382/153, 154, 190, 201, 285
See application file for complete search history.

(56) References Cited

U.S. PATENT DOCUMENTS

| | | | | |
|---|---|---|---|---|
| 6,732,826 B2* | 5/2004 | Song et al. | | 180/169 |
| 7,831,094 B2* | 11/2010 | Gupta et al. | | 382/190 |
| 7,873,447 B2* | 1/2011 | Oi et al. | | 701/23 |
| 7,916,931 B2* | 3/2011 | Lee et al. | | 382/153 |
| 8,073,200 B2* | 12/2011 | Oi et al. | | 382/103 |
| 2004/0076324 A1* | 4/2004 | Burl et al. | | 382/153 |
| 2004/0128031 A1* | 7/2004 | Wang | | 700/258 |
| 2005/0233816 A1* | 10/2005 | Nishino et al. | | 473/131 |
| 2005/0238200 A1* | 10/2005 | Gupta et al. | | 382/103 |
| 2006/0072809 A1* | 4/2006 | Hashimoto et al. | | 382/153 |

(Continued)

OTHER PUBLICATIONS

Choi et al., A line feature based Slam with low grade range sensors using geometric constraints and active exploration for mobile robot, 2008, Springer, Auton Robot, vol. 24, pp. 13-27.*

*Primary Examiner* — Khoi Tran
*Assistant Examiner* — Jaime Figueroa
(74) *Attorney, Agent, or Firm* — Ked & Associates, LLP

(57) ABSTRACT

Disclosed is a mobile robot and a controlling method of the same. An entire movement region is divided into a plurality of regions, and a partial map is gradually made by using feature points of a plurality of images of the divided regions. Then, the map is compensated into a closed curved line, thereby making an entire map. Furthermore, when the mobile robot is positioned at a boundary of neighboring regions of the cleaning region, the boundary where a closed curved line is formed, the mobile robot compensates for its position based on a matching result between feature points included in the map, and feature points extracted from images captured during a cleaning process.

18 Claims, 7 Drawing Sheets

(56) References Cited

U.S. PATENT DOCUMENTS

| | | | |
|---|---|---|---|
| 2006/0165276 A1* | 7/2006 | Hong et al. | 382/153 |
| 2007/0203622 A1* | 8/2007 | Senoo et al. | 701/23 |
| 2007/0276541 A1* | 11/2007 | Sawasaki | 700/253 |
| 2007/0282484 A1* | 12/2007 | Chung et al. | 700/245 |
| 2008/0273791 A1* | 11/2008 | Lee et al. | 382/153 |
| 2008/0294338 A1* | 11/2008 | Doh et al. | 701/209 |
| 2008/0304707 A1* | 12/2008 | Oi et al. | 382/103 |
| 2009/0024251 A1* | 1/2009 | Myeong et al. | 700/259 |
| 2009/0055020 A1* | 2/2009 | Jeong et al. | 700/251 |
| 2009/0115655 A1* | 5/2009 | Scherzinger | 342/357.02 |
| 2009/0149990 A1* | 6/2009 | Myeong et al. | 700/245 |
| 2009/0149994 A1* | 6/2009 | Kim et al. | 700/258 |
| 2009/0154791 A1* | 6/2009 | Yoon et al. | 382/153 |
| 2010/0094460 A1* | 4/2010 | Choi et al. | 700/251 |
| 2010/0152945 A1* | 6/2010 | Park et al. | 701/28 |
| 2010/0286905 A1* | 11/2010 | Goncalves et al. | 701/200 |
| 2012/0213443 A1* | 8/2012 | Shin et al. | 382/190 |

\* cited by examiner

MOBILE ROBOT AND CONTROLLING METHOD OF THE SAME

CROSS-REFERENCE TO A RELATED APPLICATION

Pursuant to 35 U.S.C. §119(a), this application claims the benefit of earlier filing date and right of priority to Korean Application No. 10-2009-0019459, filed on Mar. 6, 2009, the content of which is incorporated by reference herein in its entirety.

BACKGROUND OF THE INVENTION

1. Field of the Invention

The present invention relates to a mobile robot, and particularly, to a mobile robot capable of making a map while moving to form a closed curved line, and capable of performing a position compensation when approaching to the closed curved line, and a controlling method of the same.

2. Background of the Invention

A mobile robot indicates an autonomous cleaner capable of performing an autonomous cleaning process by using a charged battery as a driving source, and by moving along an inputted program.

A user does not directly perform a cleaning process with moving a cleaner, but makes the mobile robot perform an autonomous cleaning process by manipulating the mobile robot with using a remote control or simple driving buttons. This may allow the user to make less efforts in performing a cleaning process, and may save cleaning time.

This mobile robot is provided with an obstacle sensor configured to detect an obstacle positioned on a movement path. Upon detecting a front obstacle by the obstacle sensor, the mobile robot moves to avoid the detected obstacle.

However, the conventional mobile robot has the following problems.

Firstly, the conventional mobile robot adopts a random moving method, and is not configured so as to recognize its position. This may cause the mobile robot not to recognize a cleaned region and a non-cleaned region.

Furthermore, the conventional mobile robot may repeatedly clean only parts of the entire regions to be cleaned.

SUMMARY OF THE INVENTION

Therefore, an object of the present invention is to provide a mobile robot capable of gradually making a map by dividing an entire movement region into a plurality of regions, and by using feature points of a plurality of images captured at the divided regions, and a controlling method of the same.

Another object of the present invention is to provide a mobile robot capable of minimizing an error of a finally completed map by making a map of the entire region by compensating for partial maps of divided regions into closed curved lines, and a controlling method of the same.

Still another object of the present invention is to provide a mobile robot capable of compensating for its position based on a matching result between feature points included in a map, and feature points extracted from images captured by the mobile robot when the mobile robot is positioned at a boundary of neighboring regions of a cleaning region, the boundary where a closed curved line is formed, and a controlling method of the same.

To achieve these and other advantages and in accordance with the purpose of the present invention, as embodied and broadly described herein, there is provided a method for controlling a mobile robot, the method comprising: obtaining image information captured on a movement region at predetermined time intervals while moving the mobile robot such that a movement path forms a closed curved line; and extracting feature points from the obtained image information, and making a map of the movement region based on the extracted feature points.

The method may further comprise calculating position information varied according to movement of the mobile robot.

The step of obtaining image information may comprise obtaining two or more images at different positions of the movement region.

The method further comprise matching features points of the two or more images with each other.

The step of making a map may comprise making a map on the current movement position based on the matching information of the feature points, and the calculated position information.

The method may further comprise compensating for the created map such that the movement path forms a closed curved line. The step of compensating for the created map may comprise determining whether the movement path is a closed curved line; and connecting a starting point and an ending point of the movement path when the movement path is not a closed curved line.

The method may further comprise dividing an entire region into a plurality of movement regions.

And, the method may further comprise making a map of the entire region by connecting maps of the plurality of divided movement regions to each other.

According to another aspect of the present invention, there is provided a method for controlling a mobile robot, the method comprising: obtaining image information of a cleaning region at predetermined time intervals while performing a cleaning process along a pre-made map; and extracting feature points from the obtained image information, and matching the extracted feature points with feature points included in the map; and compensating for a position of the mobile robot based on a matching result between the feature points.

The method may further comprise making a map of the cleaning region such that a movement path forms a closed curved line, based on the feature points extracted from the plurality of images taken while moving the mobile robot on the cleaning region, and the movement position of the mobile robot.

The step of compensating for a position of the mobile robot may comprise compensating for a position of the mobile robot when the number of the matched feature points is more than a reference value.

The step of compensating for a position of the mobile robot may comprise re-executing the steps when the number of the matched feature points is less than a reference value.

To achieve these and other advantages and in accordance with the purpose of the present invention, as embodied and broadly described herein, there is also provided a mobile robot, comprising: a detection unit configured to obtain image information on a movement region at predetermined time intervals while moving such that a movement path forms a closed curved line; and a control unit configured to extract feature points from the obtained image information, and to make a map of the movement region based on the extracted feature points.

The mobile robot may further comprise a position detection unit configured to calculate position information varied according to movement of the mobile robot.

The control unit may comprise an image processor configured to match the extracted feature points of two or more images with each other; and a movement controller configured to control movement of the mobile robot.

The control unit may be configured to make a map on the current movement position based on the matching information of the feature points, and the calculated position information.

The control unit may be configured to determine whether the movement path is a closed curved line. And, the control unit may be configured to make a map when the movement path is a closed curved line as a result of the determination, but to connect a starting point and an ending point with each other when the movement path is not a closed curved line.

The control unit may make a map by dividing an entire region into a plurality of movement regions.

The control unit may be configured to extract feature points from image information obtained while performing a cleaning process along a pre-made map, and to match the extracted feature points with feature points included in the map. And, the control unit may be configured to compensate for its position based on a matching result between the feature points.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

For the sake of brief description with reference to the drawings, the same or equivalent components will be provided with the same reference numbers, and description thereof will not be repeated.

Hereinafter, a preferred embodiment of the present invention will be explained in more detail with referenced to the attached drawings.

Figure 1:
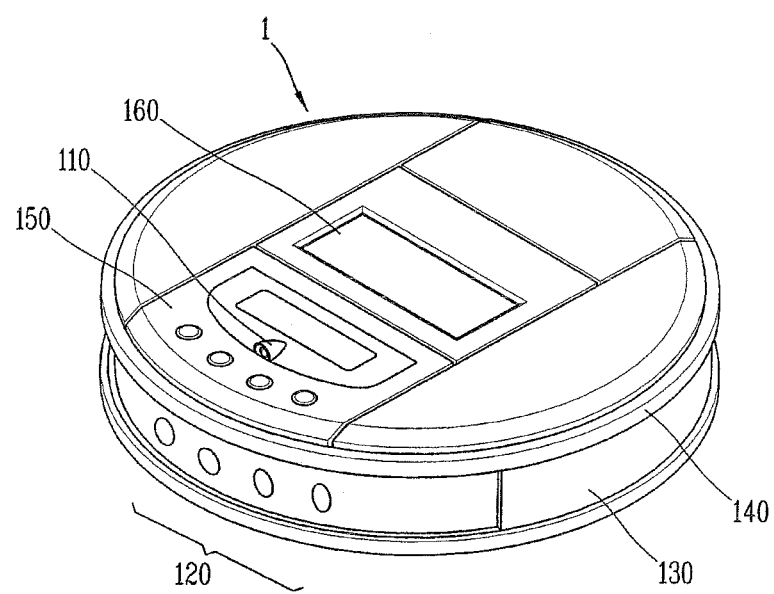
FIG. 1 is a schematic perspective view of a mobile robot according to the present invention.
Figure 2:
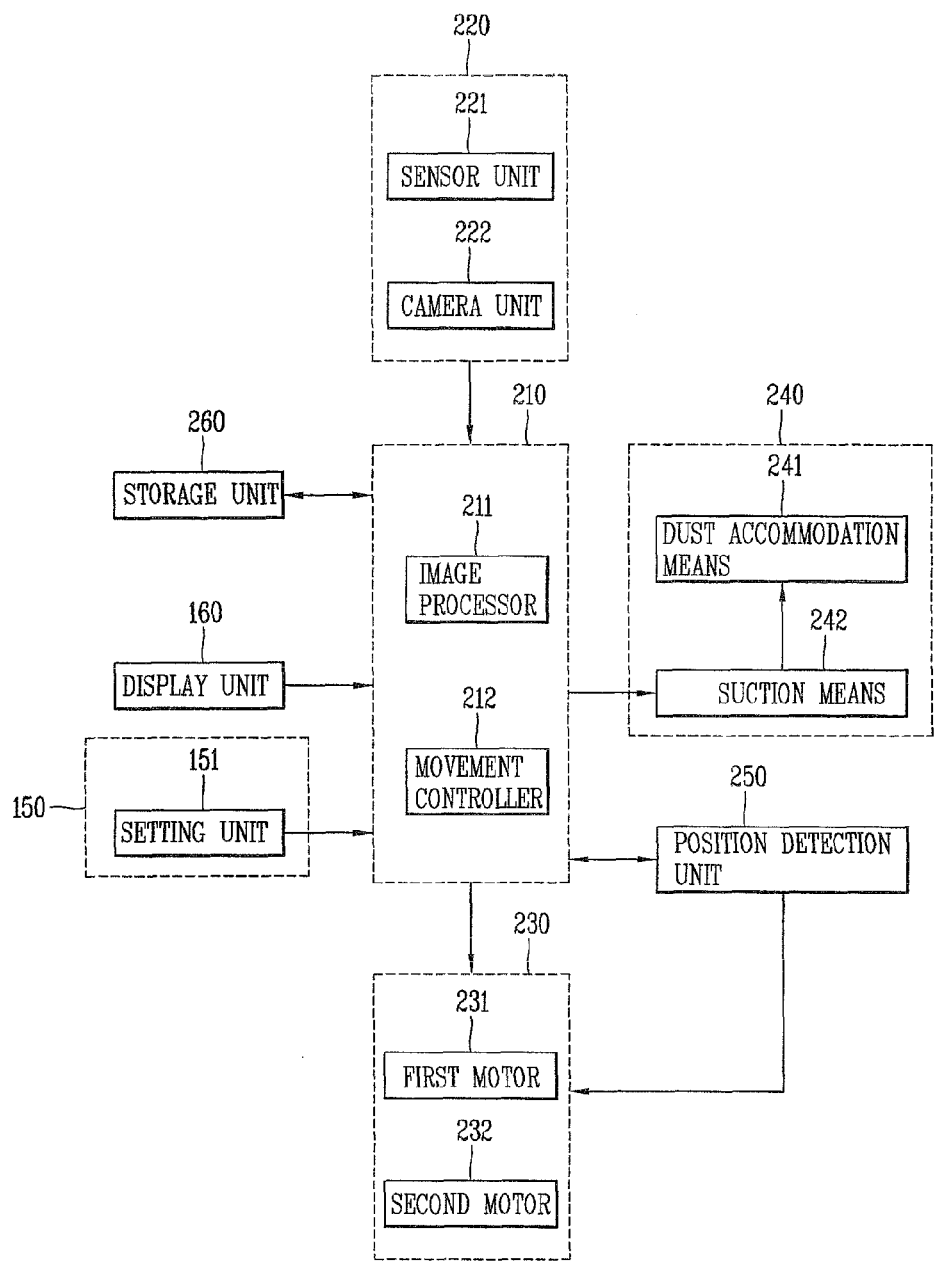
FIG. 2 is a block diagram schematically showing a configuration of the mobile robot of FIG. 1.

FIG. 1 is a schematic perspective view of a mobile robot according to the present invention, and FIG. 2 is a block diagram schematically showing a configuration of the mobile robot of FIG. 1.

A mobile robot according to the present invention will be explained in more detail with reference to FIGS. 1 and 2.

As shown in FIG. 1, the mobile robot 1 includes a case 140 which forms the appearance; and a front sensor 120 disposed to correspond to an outer side surface of the case 140, and including two or more signal transmitters and two or more signal receivers. Here, the case 140 is formed in a circular disc shape having a predetermined height. The front sensor 120 serves to detect a distance between the mobile robot 1 and an indoor wall or obstacle. For instance, the front sensor may be implemented as a ultrasonic wave sensor. The case 140 is provided with a bumper 130 configured to attenuate an impact generated when colliding with an obstacle.

Furthermore, the mobile robot 1 is provided with a camera 110 at an upper front side thereof so as to capture images of a region to be cleaned, or a movement region. The camera 110 is installed such that the mobile robot 1 captures images of front and upper sides of its movement path. In the preferred embodiment, the camera is fixedly installed. However, the camera may be installed so as to be moveable by a predetermined angle in right and left directions, or in upper and lower directions.

Referring to FIG. 2, the mobile robot comprises a detection unit 220 configured to obtain image information on a movement region at predetermined time intervals while moving such that a movement path forms a closed curved line; and a control unit 210 configured to extract feature points from the obtained image information, and to make a map of the movement region based on the extracted feature points.

More specifically, referring to FIGS. 1 and 2, the mobile robot 1 comprises a case 140, a driving unit 230 including an agitator, supplementary wheels and driving wheels, a suction unit 240, a manipulation unit 150, a battery (not shown), a detection unit 220, and a control unit 210. The mobile robot 1 further comprises a storage unit 260.

The agitator is rotatably installed at the mobile robot 1, and brushes foreign materials such as dusts or dirties on the floor so that the foreign materials can be smoothly sucked into the suction unit 240.

The driving unit 230 transmits a driving force to left and right wheels of the mobile robot 1 according to a signal transmitted from the control unit 210. According to a driving of the left and right wheels, the mobile robot 1 can move to a front side. The left wheel receives a driving force generated by a first motor 231, whereas the right wheel receives a driving force generated by a second motor 232.

The suction unit 240 consists of a dust accommodation means 241, a suction means 242, a suction duct (not shown), a filter (not shown) and a suction opening (not shown), thereby sucking and accommodating therein foreign materials on the floor.

The manipulation unit 150 may include a button or key type of setting unit 151 configured to input a command for controlling the mobile robot 1. Near the manipulation unit 150, may be installed a display unit 160 configured to display each kind of information of the mobile robot 1. The display unit 160 may be installed on the manipulation unit 150.

The battery supplies a driving force to the driving unit 230, etc. This battery may be charged from a charging plate (not shown).

The detection unit 220 includes a sensor unit 221 configured to emit a signal for sensing an obstacle, and to sense the obstacle or a movement path by receiving a signal reflected from the obstacle; and a camera unit 222 including a camera 110 configured to capture images in a forward direction of the mobile robot 1.

The sensor unit 221 may include a front sensor 120 configured to sense a front object, a side wall sensor (not shown) arranged on a side surface of the mobile robot 1 and sensing a wall surface, an IR sensor (not shown) configured to sense the charging plate so as to charge the battery, etc.

The camera unit 222 captures images in a forward direction of the mobile robot according to a control signal of the control unit 210, in a moving or stopped state of the mobile robot 1 on a cleaning region. In a case that the camera unit 222 is rotatable in upper and lower directions or in right and left directions, images can be captured in upper and lower directions and in right and left directions of the peripheral regions of the mobile robot 1.

In the present invention, the camera unit 222 captures images of the peripheral regions of the mobile robot 1 at predetermined time intervals.

The control unit includes an image processor 211 configured to match the extracted feature points of two or more images with each other, and a movement controller 212 configured to control movement of the mobile robot 1.

The image processor 211 receives the captured images, and performs an image processing, thereby extracting feature points from the captured images. The feature points indicate objects or regions having large frequency variation widths when images have been converted into frequency regions, which may correspond to corners or windows, etc.

The driving unit 230 drives the first and second motors 231, 232 according to a control signal outputted from the control unit 210, thereby moving the mobile robot 1. The first and second motors 231, 232 of the driving unit 230 are connected to left and right wheels of the mobile robot 1. Therefore, the mobile robot 1 is moved in back and forth directions and in right and left directions according to rotation speeds and rotation directions of the first and second motors 231, 232.

The mobile robot 1 according to the present invention further comprises a position detection unit 250 configured to calculate position information varied according to movement of the mobile robot 1. The position detection unit 250 detects position change by motion of the mobile robot 1, and is attached to one side of the wheel to detect an rpm of the wheel. Based on the rpm of the wheel, the movement controller 212 may detect a spacing degree of the mobile robot 1 from the initial position. In this case the position detection unit 250 preferably includes an encoder.

The storage unit 260 consists of a non-volatile memory device such as an EEPROM or a flash memory, and stores therein an operation program for driving the mobile robot 1. Furthermore, the storage unit stores therein each kind of information of the mobile robot 1, such as image information sensed by the detection unit 220, feature points extracted from the image information, and position information of the mobile robot 1 detected by the position detection unit 250.

The control unit 210 controls the entire operation of the mobile robot 1. Especially, in case of dividing the entire region to be cleaned into a plurality of movement regions so as to make a map of the cleaning region, the control unit 210 makes a map of each divided region, and makes an entire map based on the maps of the divided plurality of regions.

In this case, the control unit 210 gradually makes a partial map based on image information captured by the camera unit 222, feature points extracted from the image information by the image processor 211, and position information of the mobile robot 1 detected by the position detection unit 250. Then, the control unit 210 makes an entire map by matching common feature points of neighboring regions among the plurality of regions with each other.

The control unit 210 determines whether the movement path is a closed curved line; and makes a map when the movement path is a closed curved line. On the other hand, the control unit 210 connects a starting point and an ending point of the movement path when the movement path is not a closed curved line.

The control unit 210 extracts feature points from image information obtained while performing a cleaning process along a pre-made map, and matches the extracted feature points with feature points included in the map. Based on a matching result between the feature points, the control unit 210 compensates for the position of the mobile robot 1.

The movement controller 212 controls the driving unit 230 configured to move the mobile robot 1 according to a command outputted from an operation program of the mobile robot 1.

Figure 3:
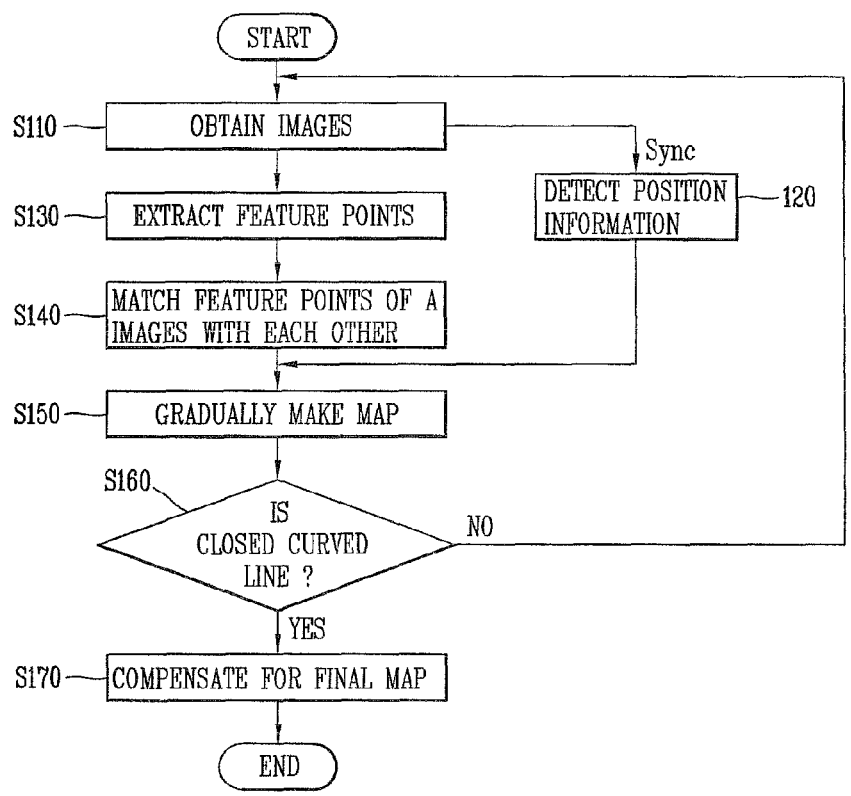
FIGS. 3 and 4 are flow charts schematically showing a method for controlling a mobile robot according to the present invention.

Referring to FIG. 3, a method for controlling a mobile robot according to one preferred embodiment of the present invention comprises: obtaining image information on a movement region at predetermined time intervals while moving the mobile robot such that a movement path forms a closed curved line (S110), and extracting feature points from the obtained image information, and gradually making a map of the movement region based on the extracted feature points (S150). FIG. 3 shows a method for gradually making a map of the mobile robot 1.

The method may further comprise calculating position information varied according to movement of the mobile robot (S120).

The step of obtaining image information (S110) may comprise obtaining two or more images at different positions of the movement region.

The method further comprise matching features points of the two or more images with each other (S140).

The step of making a map (S150) may comprise making a map on the current movement position based on the matching information of the feature points, and the calculated position information.

The method may further comprise compensating for the created map such that the movement path forms a closed curved line. The step of compensating for the created map may comprise determining whether the movement path is a closed curved line (S160); and connecting a starting point and an ending point of the movement path when the movement path is not a closed curved line (step not shown).

The method may further comprise dividing an entire region into a plurality of movement regions.

And, the method may further comprise making a map of the entire region by connecting maps of the plurality of divided movement regions to each other (S170).

Hereinafter, a method for controlling a mobile robot according to one preferred embodiment of the present invention will be explained in more detail with reference to FIGS. 5 to 8.

Figure 5:
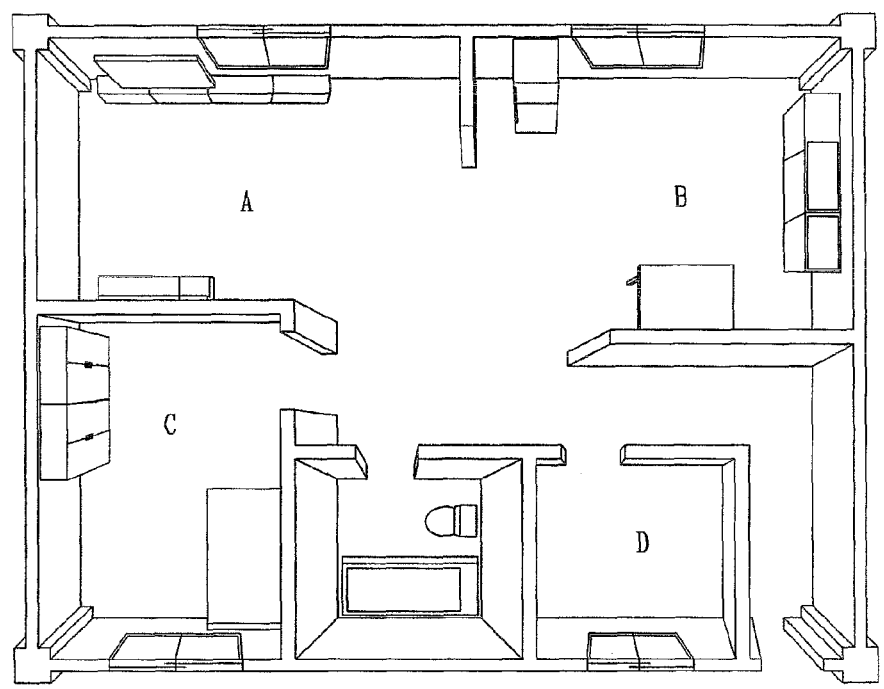
FIG. 5 is a view showing an entire region including a plurality of regions A, B, C and D.
Figure 6:
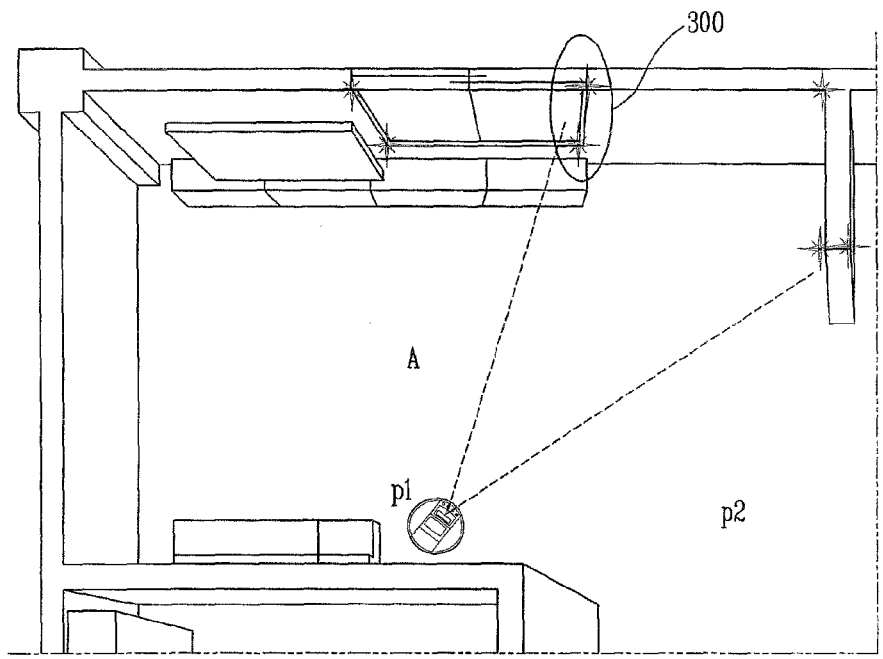
FIG. 6 is a view showing feature points extracted from images of peripheral regions, the images taken by the mobile robot at a first position (p1) of one region (A) of FIG. 5.
Figure 7:
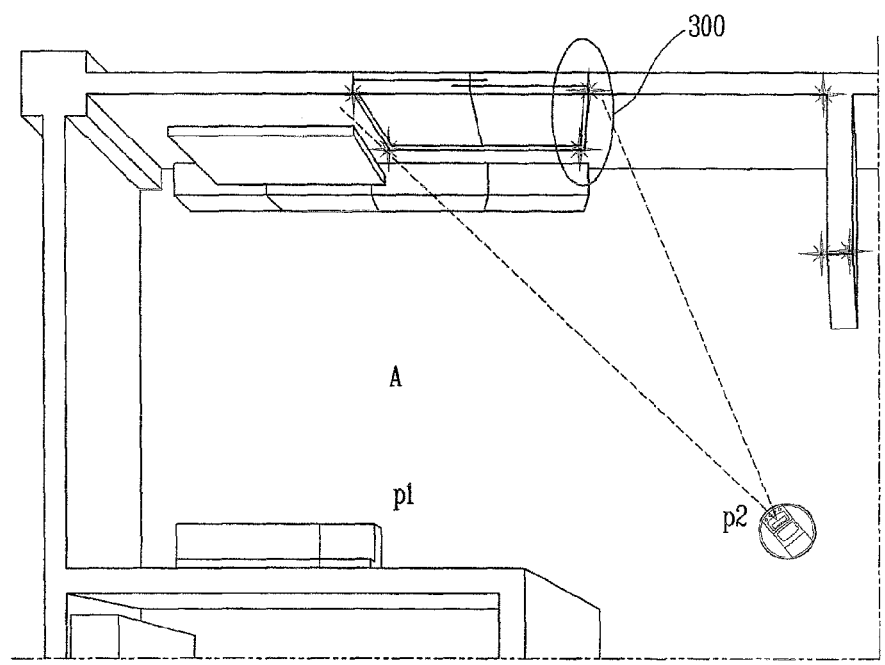
FIG. 7 is a view showing feature points extracted from images of peripheral regions, the images taken by the mobile robot at a second position (p2) of one region (A) of FIG. 5.
Figure 8:
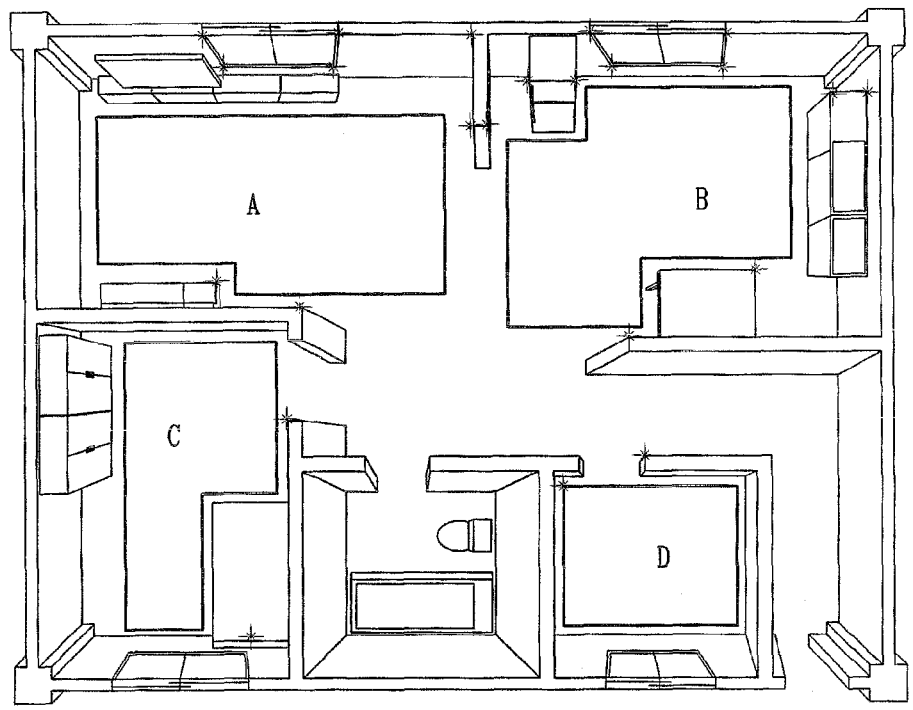
FIG. 8 is a view showing a map of an entire region, the entire map made by dividing a cleaning region into four regions (A, B, C and D), and feature points are displayed on the entire map by repeating processes performed at said one region (A)

FIG. 5 is a view showing an entire region to be cleaned. FIG. 6 is a view showing feature points extracted from images of the peripheral regions, the images taken by the mobile robot at a first position (p1) of one region (A) of FIG. 5. FIG. 7 is a view showing feature points extracted from images of the peripheral regions, the images taken by the mobile robot at a second position (p2) of one region (A) of FIG. 5. And, FIG. 8 is a view of a map of an entire region, the entire map made by dividing a cleaning region into four regions (A, B, C and D), and feature points are displayed on the entire map by repeating processes performed at said one region (A).

The mobile robot captures two or more images, by the camera unit 222, at first and second positions (p1, p2) different from each other on said one region (A) while moving on said one region (A) (S110). The captured images are processed by the image processor 211. Here, the mobile robot 1 extracts feature points through the image processing, and displays the extracted feature points on the map being made (S140). These feature points may be utilized when the mobile robot compensates for its position during a cleaning process.

The mobile robot obtains image information at predetermined time intervals so that feature points of images captured at the first position, and feature points of images captured at the second position can overlap each other. Preferably, the mobile robot captures images so that the images captured at the first and second positions can have common feature points.

The mobile robot calculates position information by the position detection unit 250, the position information varied as the mobile robot moves from a starting point. It is preferable to detect the position information by synchronizing with the time point when capturing the peripheral images (S120).

The mobile robot makes a map by executing wall following from the first position to the second position. In this case, the mobile robot matches feature points of a first image taken at the first position (p1) of FIG. 6, with feature points of a second image taken at the second position (p2) of FIG. 7 (S140). Here, the mobile robot 1 makes a map based on a plurality of matched common feature points 300 among the feature points extracted from the first and second images.

The mobile robot 1 compensates for the map on the current movement position (p2) based on the matching information of the feature points, and the calculated position information (S150). The step of compensating for the map based on the matching information of the feature points and the calculated position information at the region (A) is repeatedly performed until a map of the region (A) is completed.

The first and second images are images consecutively captured according to a time order for capturing the peripheral regions. More concretely, the first and second images may be a current image and a previous image, or a current image and a next image. It is preferable to capture the peripheral regions in an overlapped manner so that the captured two images can have common features points more than a predetermined number.

After making a map of the region (A), the mobile robot determines whether a starting point of the mobile robot is the same as an ending point (S160). That is, the mobile robot determines whether the moving path forms a closed curved line.

If the starting point is different from the ending point as a result of the determination, the mobile robot compensates for the created map by making the movement path in a closed curved line. The reason why the movement path does not form a closed curved line is because there may occur errors in determining positions of the mobile robot even if the entire map is gradually completed by compensating for the partial maps. Therefore, the final map may have errors removed therefrom by compensating for the partial maps so that the movement path can form a closed curved line.

Once the processes for making the map of said one region (A) are equally applied to another regions (B, C, D), the entire map of the plurality of divided regions is completed.

Figure 4:
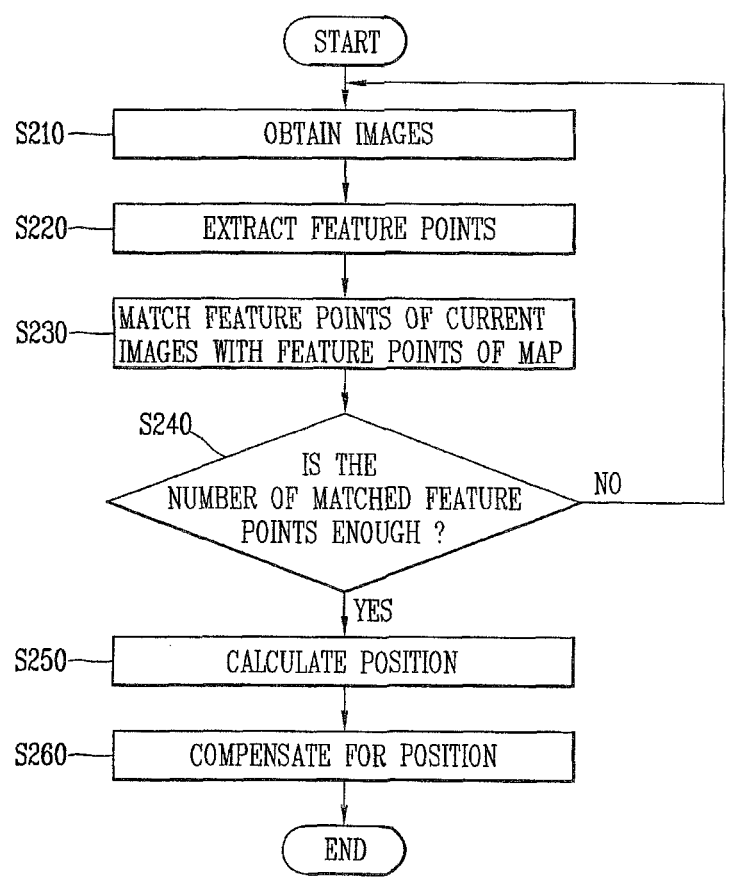

Referring to FIG. 4, a method for controlling a mobile robot according to another preferred embodiment of the present invention comprises obtaining image information of a cleaning region at predetermined time intervals while performing a cleaning process along a pre-made map (S210); and extracting feature points from the obtained image information, and matching the extracted feature points with feature points included in the map (S220, S230); and compensating for a position of the mobile robot based on a matching result between the feature points (S260).

The method further comprises making a map of the cleaning region such that a movement path forms a closed curved line, based on the feature points extracted from the plurality of images taken while moving on the cleaning region, and the movement position of the mobile robot.

The step of compensating for a position of the mobile robot comprises compensating for a position of the mobile robot when the number of the matched feature points is more than a reference value ('YES' in S240).

The step of compensating for a position of the mobile robot comprises re-executing the steps when the number of the matched feature points is less than a reference value ('NO' in S240).

Figure 9:
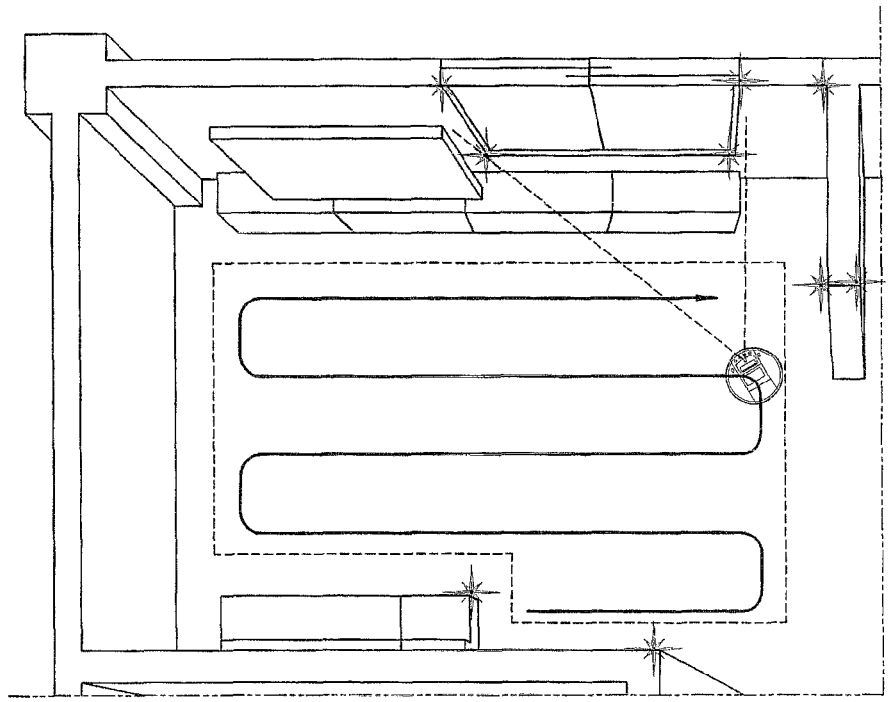
FIG. 9 is a view to explain a process for autonomously compensating for a position of the mobile robot of FIG. 1, based on the feature points extracted from images taken while the mobile robot performs a cleaning process.

Referring to FIGS. 4 and 9, will be explained a method for controlling a mobile robot according to another preferred embodiment of the present invention, i.e., a method for compensating for a position of the mobile robot. Configurations of the device will be explained with reference to FIGS. 1 and 2.

As shown in FIGS. 5 to 8, the mobile robot makes a map of the cleaning region such that a movement path forms a closed curved line, based on the feature points extracted from the plurality of images taken while moving on the cleaning region, and the movement position of the mobile robot.

First of all, the mobile robot performs a cleaning process while moving on the cleaning region along the created map. As shown in FIG. 9, the mobile robot moves on a boundary between the divided regions while maintaining a constant interval from the firstly cleaned region.

Upon reaching the boundary region on the map formed in a closed curved line, the mobile robot captures the peripheral images thus to extract feature points (S210,S220). Then, the mobile robot 1 matches the extracted feature points with feature points displayed on the map (S230). According to a result of the matching, the mobile robot continues to perform the cleaning process, or performs the cleaning process after compensating for its position.

The mobile robot 1 determines whether the number of the matched feature points is more than a reference value (S240). If the number of the matched feature points is less than a reference value, the mobile robot obtains image information of the peripheral regions until the number of the matched feature points reaches the reference value, thereby extracting feature points from the image information. And, the mobile robot matches the extracted feature points with the feature points displayed on the map, which is repeatedly performed.

As aforementioned, in the mobile robot and the controlling method of the same, the entire movement region of the mobile robot is divided into a plurality of regions, and feature points of images of the plurality of divided regions are extracted. Then, a map is gradually made by using common feature points of the images sequentially obtained. Then, completed partial maps of the divided regions are compensated into closed curved lines. Finally, the entire map is made by using common feature points of the neighboring divided regions. This may minimize errors of the created map.

Furthermore, when the mobile robot is positioned at a boundary of neighboring regions of the cleaning region, the boundary where a closed curved line is formed, the mobile robot compensates for its position based on a matching result between the feature points included in the gradually-created map, and the feature points extracted from images captured during a cleaning process. This may enhance accuracy of the position compensation.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for a mobile robot, the method comprising:
    dividing an entire region to be cleaned into a plurality of movement regions;
    obtaining image information at a predetermined time interval while moving within each of the plurality of movement regions;
    extracting feature points from the obtained image information, and making sub maps corresponding to each of the plurality of movement regions based on the extracted feature points;
    determining whether respective movement paths, generated by movement of the mobile robot, corresponding to the each of the plurality of movement regions form a closed curved line by checking whether a starting moving point and an ending moving point of the respective movement paths are the same as each other;
    compensating a sub map having a movement path, not forming a closed curved line, by connecting a starting point and an ending point of the movement path; and
    making a map of the entire region by connecting the sub maps.

2. The method of claim 1, further comprising calculating position information varied according to the movement of the mobile robot.

3. The method of claim 2, wherein the step of obtaining image information comprises obtaining two or more images at different positions of the movement region.

4. The method of claim 3, further comprising matching feature points of the two more images with each other.

5. The method of claim 4, wherein the step of making a map comprises making a map on a current movement position based on the matching information of the feature points, and the calculated position information.

6. The method of claim 1, comprising;
    obtaining image information of a cleaning region corresponding to one of a plurality of the sub maps to be cleaned at predetermined time intervals while performing a cleaning process along the one of the sub maps;
    extracting feature points from the obtained image information, and matching extracted feature points with feature points included in the one of the sub maps; and
    compensating for a position of the mobile robot based on a matching result between the feature points,
    wherein the compensated position of the mobile robot is performed when the mobile robot is positioned at a boundary between the one sub map and neighboring sub maps of the plurality of sub maps, the boundary where a closed curved line is formed.

7. The method of claim 6, wherein the step of compensating for a position of the mobile robot comprises compensating for a position of the mobile robot when the number of the matched feature points is more than a reference value.

8. The method of claim 6, wherein the step of compensating for a position of the mobile robot comprises re-executing at least one of the method steps when the number of the matched feature points is less than a reference value.

9. A mobile robot, comprising:
    a detection unit configured to obtain image information at a predetermined time interval while moving within each of a plurality of movement regions; and
    a control unit configured to divide an entire region to be cleaned into the plurality of movement regions, to extract feature points from the obtained image information, to make sub maps corresponding to each of the plurality of movement regions based on the extracted feature points, to determine whether respective movement paths, generated by movement of the mobile robot, corresponding to the each of the plurality of movement regions form a closed curved line by checking whether a starting moving point and an ending moving point of the respective movement paths are the same as each other, to compensate a sub map having a movement path, not forming a closed curved line, by connecting a starting point and an ending point of the movement path and to make a map of the entire region by connecting the sub maps.

10. The mobile robot of claim 9, further comprising a position detection unit configured to calculate position information varied according to the movement of the mobile robot.

11. The mobile robot of claim 10, wherein the control unit comprises:
    an image processor configured to match the extracted feature points of two or more images with each other; and
    a movement controller configured to control movement of the mobile robot.

12. The mobile robot of claim 11, wherein the control unit is configured to make a map on a current movement position based on the matching information of the feature points, and the calculated position information.

13. The mobile robot of claim 9, wherein the control unit is configured to extract feature points from image information obtained while performing a cleaning process along a pre-made map, and to match the extracted feature points with feature points included in the map, wherein the control unit is configured to compensate for its position based on a matching result between the feature points.

14. A mobile robot, comprising:
   detector configured to obtain image information at a time interval while moving within each of a plurality of movement regions; and
   a controller configured to divide a region to be cleaned into the plurality of movement regions, to extract feature points from the obtained image information, to make sub maps corresponding to each of the plurality of movement regions based on the extracted feature points, to determine whether respective movement paths, generated by movement of the mobile robot, corresponding to the each of the plurality of movement regions form a closed figure by checking whether a starting moving point of the figure and an ending moving point of the figure are the same as each other, to compensate a sub map having a movement path that forms an open figure, by connecting a starting point and an ending point of the open figure, and to make a map of the entire region by connecting the sub maps.

15. The mobile robot of claim 14, further comprising a position detector configured to calculate position information which varies according to the movement of the mobile robot.

16. The mobile robot of claim 15, wherein the controller comprises:
   an image processor configured to match the extracted feature points of two or more images with each other; and a movement controller configured to control movement of the mobile robot.

17. The mobile robot of claim 16, wherein the controller is configured to make a map on a current movement position based on the matching information of the feature points, and the calculated position information.

18. The mobile robot of claim 14, wherein the controller is configured to extract feature points from image information obtained while performing a cleaning process along a pre-made map, and to match the extracted feature points with feature points included in the map, wherein the control unit is configured to compensate for its position based on a matching result between the feature points.

* * * * *